United States Patent Office 2,862,881
Patented Dec. 2, 1958

2,862,881

WATER-IN-OIL EMULSION WELL FLUID, METHODS OF USING AND PREPARING SAME

William A. Reddie, Houston, Tex., assignor to Magnet Cove Barium Corporation, Houston, Tex., a corporation of Arkansas No Drawing. Application August 1, 1955
Serial No. 525,799

17 Claims. (Cl. 252—8.5)

This invention relates to well fluids of the water-in-oil emulsion type which are especially suitable for use in the drilling, completing or work-over of wells and to compositions for imparting desirable characteristics to water-in-oil emulsions. It pertains also to the drilling, completing or working over of wells with the compositions herein described.

Oil base fluids which are utilized in well operations may be said to fall within two broad classes, the two classes having the common characteristic of oil being the continuous phase. In the first of these classes, oil is essentially the only liquid ingredient present although very minor portions of water (less than 10%) may form a dispersed phase. This water is usually incidentally added along with stabilizers, salts and other ingredients employed in making up the well fluid and is present in such small quantities that the well fluid is considered to be essentially all oil. The second class of well fluids contain water dispersed in such large quantities (10% and upward) in the continuous oil phase as to give the fluid characteristics which differ markedly from those of a simple oil base fluid which has substantially only oil present. The invert type (water-in-oil) of emulsion well fluids has been developed to overcome certain deficiencies of the simple oil base fluids, but, being emulsions, have presented certain problems not encountered with the simple oil base systems. Since many of the primary advantages of the invert system arise from the fact that water does not contact the earthen formations, it is necessary that the system be stable and not susceptible of inverting to an oil-in-water emulsion. Thus, it is very important that the invert system be stable over a rather broad range of temperatures. Since many wells have rather high bottom hole temperatures, it is desirable that the system be stable as far above 300° F. as possible. It is also important that the system be stable to the addition of weighting materials and clays so that if necessary, weighting materials can be added to form a well fluid having weights of 18 or more pounds per gallon. Additionally, the invert system must be able to suspend the weight materials for a considerable period of time and at elevated temperatures. It must also be resistant to contaminants, such as cement, salt, anhydrite, etc., so that it can resist these effectively and without undue change in properties. Another desideratum is that the system should be capable of being compounded with all types and weights of field muds so that these can be used to provide the discontinuous or water phase. As a facet of this, the emulsion must be formed easily and quickly without requiring excessively violent agitation. It must be susceptible of ease of control in handling so as to have a wide working range of effectiveness in order that alterations to meet different well conditions do not impair the properties of the fluid. Further, it should be responsive to treating agents introduced into the system to counteract or alter its properties. It is also commercially important that the ingredients of the emulsion system, except the water and oil, be susceptible of being mixed together to form a dry, free-flowing concentrate which itself can be manufactured easily, present a good uniform appearance, give consistent properties to an emulsion when mixed therewith, and not deteriorate or adversely react upon aging. Lastly, and of great importance, the fluid must be economically feasible to use and give the most desirable properties for the amount of money it costs.

It is a general object of this invention to provide an invert emulsion fluid for use in wells and method for using the same in wells which satisfactoritly meets the foregoing requirements to a degree not heretofore known to have been attained by any single formulation.

Another object is to provide such a fluid and a dry, free-flowing concentrate for preparing the same, the concentrate comprising essentially all of the active ingredients of the mud except the oil and water whereby the dry mix can be compounded at a central point of manufacture under carefully controlled conditions and then transferred to the field where it can be made up as a part of a drilling fluid by a simple mixing process.

Another object is to provide a dry, free-flowing concentrate which will, when mixed with oil and water, result in a water-in-oil emulsion fluid which remains stable and exhibits a low fluid loss over a broad range of temperatures, in the presence of contaminants commonly found in a well and when formulated from common water base field muds or when weighted with common weighting materials.

Another object is to provide such an emulsion stabilized by a combination of certain ingredients which interact to effectively yield a very stable emulsion capable of being used under varying field conditions and which can be readily treated to maintain or change the properties thereof.

Another object is to provide an additive for reducing the fluid loss of such an emulsion.

Another object is to provide such an emulsion which is capable of being weighted with ordinary weighting materials to very high gravities without any appreciable settling of the weighting material.

Another object is to provide a dry, free-flowing concentrate in which normally liquid or highly deliquescent materials are intermingled with a preselected type or types of adsorptive clay or other minerals present in an amount sufficient to render the mixture dry and free-flowing so that it can be easily handled and shipped and also stored over long periods of time without caking, such mixture having a superior ability to stabilize and impart improved properties to a water-in-oil emulsion well fluid.

Another object of this invention is to provide a combination of emulsion stabilization ingredients which suppresses the fluorescence of highly fluorescent oils whereby oil shows can be determined from the emulsion when used as a well fluid.

Another object is to provide an invert type emulsion which exhibits gel strengths of substantial magnitude.

Another object is to provide a method of compounding a dry, free-flowing concentrate of the active ingredients which serve to stabilize an emulsion of water in oil by which method there results a concentrate capable of imparting characteristics to such an emulsion which are superior to those imparted by concentrates compounded in other manners.

Other objects, advantages and features of this invention will be apparent to one skilled in the art upon a consideration of the written specification and the appended claims.

Generally, one aspect of the concept of this invention involves the use of a heavy fraction derived from vegetable oils, animal fats or tall oil in combination with petroleum sulfonates and certain extracts from wood as the active organic ingredients for stabilization of a water-in-oil emulsion. Employed with these active organic ingredients are certain inorganic salts including alkaline earth metal bases such as the oxides or hydroxides and, preferably, salts of polyvalent metals such as alkaline earth metal salts of strong acids. It has been found that the combination of ingredients of this invention can be readily compounded into a dry, free-flowing concentrate which, upon addition to oil and water, results in an emulsion having those characteristics mentioned above as being desirable in an invert type well fluid and which is particularly stable at elevated temperatures and in the presence of weighting materials. The exact role played by each of the ingredients is not known but it has been observed that each affects certain properties of the emulsion and it is the combined effects of all the ingredients which permit the formulation of a well fluid having the above-outlined desired properties. A more detailed discussion of these effects will be given below.

As another aspect of this invention, it has been found that the foregoing ingredients can be combined in a particular manner with selected ones of adsorptive clays or minerals of certain types to provide a dry, free-flowing concentrate which imparts characteristics to a water-in-oil emulsion which are superior to those imparted by concentrates made in other manners. Thus, it has been found that the addition to the clay of the heavy oil or fat fraction in admixture with the petroleum sulfonate gives a superior concentrate than is the case when the heavy fraction and the sulfonate are added separately. In this manner, there is not only provided a dry, free-flowing mixture or concentrate capable of being bagged and easily used in the field to make up the desired water-in-oil emulsion fluid but also the emulsion has superior properties.

As another aspect of this invention, it has been found that certain magnesium salts or oxides, particularly magnesium sulfate, have a marked effect upon the fluid loss characteristics of the emulsion of this invention. Thus, by the addition of small amounts of such salts or oxides, not only can the fluid loss be reduced to a desired value, but also the fluid which is lost tends to be all oil rather than a mixture of oil and water or water alone. Of course, such an effect is of importance with invert emulsions because one of the primary advantages in their use, as before stated, is to prevent water from contacting earthen formations.

As still another aspect, it has been found that the emulsion of this invention can be made up with strongly fluorescent oils, such as diesel oil, and yet the emulsion exhibits no more fluorescence than is the case when it is made up with non-fluorescent oils. This is true even though one of the ingredients, petroleum sulfonate, is in itself strongly fluorescent. Such an advantage can be quite material when oil shows are to be determined from a drilling or completion mud by the fluorescent technique.

In accordance with this invention, a preferred formula for formulating a dry, free-flowing concentrate which can be made up into a superior invert emulsion system is as follows:

| Ingredient: | Parts by weight |
| --- | --- |
| Vegetable pitch 250 | 15 |
| Petroleum sulfonate (Petronate L) | 5 |
| Wood resin extract (Vinsol Resin) | 5 |
| Calcium chloride | 10 |
| Lime (calcium hydroxide) | 10 |
| Adsorptive clay (Xact 811) | 25 |
| | 70 |

The weight of the ingredients in the above formula are given on an anhydrous basis. The figures in the right-hand column can be considered as pounds of the respective ingredients per barrel (42 gallons) of combined volume of the oil and water when a predetermined amount of the formula equal to the sum of the ingredients (70) is added to each barrel of combined water and oil. Since it is more convenient and meaningful to speak in terms of pounds per barrel of the ingredients, such practice will be adhered to in this specification and claims.

While the ingredients of the above formula can be combined in a number of different manners to yield a concentrate capable of forming a superior emulsion, a preferred procedure is to combine in suitable mixing equpiment all dry ingredients except the calcium chloride. The calcium chloride is then pulverized and mixed with the other dry ingredients. During such addition, care should be taken to prevent the calcium chloride from deliquescing and becoming excessively burdened with water. The vegetable pitch and petroleum sulfonates are blended together while heating to a temperature within the range of 200° to 250° F. to increase their fluidity. This temperature should be maintained in this range to yield acceptable results. The heated blend is then pumped gradually into the mixing equipment and blended with the dry ingredients. There results a dry, free-flowing mixture which occasionally may have a very few lumps but these will be broken up either by moving the mixture through a screw conveyor or through bagging equipment. In any event, the resulting dry free-flowing concentrate can be easily bagged, and upon shipping to the field, readily mixed with oil and water to form the desired water-in-oil emulsion. The concentrate remains dry and free-flowing even if stored for considerable periods of time at elevated temperatures.

In preparing the water-in-oil emulsion at the well site, the concentrate is preferably added to the oil before any water or water base mud is added. Upon addition of the proper amount of the concentrate to the oil (a preferred range being 20 to 70 pounds of the concentrate per barrel of emulsion), the same should be agitated thoroughly to secure an intimate admixture. The water or water base mud can then be brought in to form the final emulsion. If desired, the dry concentrate can be added to only a part of the oil which is to be in the final emulsion, then a part of the water added after which the remainder of the oil and of the water are added in successive steps. Weighting materials should not be added until the emulsion has been formed and stabilized with agitation.

It will be understood that if the ingredients of the formula given above are not to be made into a dry concentrate, they can be added separately to the oil, or part of it, in the same manner as described for the dry concentrate. In such case and particularly where a water base mud is to be used, all or a part of the adsorptive clay can be omitted. Usually such omission causes a poorer quality emulsion.

Although specific materials and concentrations are named in the above formula, it has been found that some latitude is possible with respect thereto. This is particularly true with respect to the concentrations of the ingredients employed as will be pointed out in more detail below.

HEAVY OIL OR FAT FRACTION

The principal role of this ingredient in the emulsion is to increase the stability of the emulsion against inversion or deterioration when exposed to high temperatures or pressures and to reduce the fluid loss from the emulsion. It has another very important function in that it increases the ability of the emulsion to suspend weight material therein. It also acts as a viscosity control agent in that it permits the viscosity of the emulsion to be varied through a broad range (e. g., by addition of water or oil) while it holds the emulsion stable. It also imparts some gel strength to the emulsion and this function is of importance in many instances. It will be noted that such gel strength is developed even in the absence of certain materials, such as selected clays, or other minerals, which might be added for specifically developing gel strengths.

In general, the higher molecular weight fractions derived from animal, vegetable and tall oils and fats, and derivatives thereof, can be employed in accordance with this invention with vegetable pitch being preferred. This class of materials is derived from crude animal fats, vegetable oils, or tall oils by fractional distillation or solvent extraction to yield a bottoms product of relatively higher average molecular weight than that of the crude oil or fat. The so-called "pitches" including vegetable pitch, tall oil pitch, ebony fat and derivatives (e. g., amine or nitrile) thereof are especially desirable. In many cases, these are derived by fractionally distilling the crude tall or vegetable oil in one or more stages. Thus, the bottoms product from the first distillation stage can be fed to a second stage for further fractional distillation to yield a second bottoms product of higher average molecular weight than that of the first bottoms product. In either event, the bottoms products have decidedly different characteristics than would be possessed by the same fraction in the crude oil or fat in that they have been subjected to heating during the distillation process which results in the formation of polymerized fatty acids, etc. Among such bottoms products are the vegetable pitches including coco pitches, the tall oil pitches, the amine and nitrile pitches resulting from the distillation of crude vegetable and tall oils which have been reacted to add one or more amine or nitrile groups thereto, and mixtures of such pitches.

The higher molecular weight fraction can also be derived from the crude oils or fats by a solvent extraction which separates the crude oils or fats into fractions of relatively low and high molecular weight.

The heavy fat or oil fraction can be used in an amount within the range of 4 to 30, preferably 5 to 20, pounds per barrel of emulsion with concentrations in the higher portion of these ranges being preferred where the emulsion is to be subjected to extreme conditions or where difficulty is encountered in preparing it from some types of field muds.

The vegetable pitches employed in accordance with this invention are commercially available from various sources. They are tacky, viscous, dark brown liquids produced from cotton seed, corn and soy bean oils by the combined action of alkali extraction, distillation and polymerization. The relatively high temperature distillation seems to be of importance in giving this product its qualities desired here since it results in increasing the quantity of polymeric materials present, especially the fatty acids. They comprise a mixture of polymerized and monomeric fatty acids, glyceryl esters, sterols, anhydrides, lactones, aldehydes, ketones and hydrocarbons. In accordance with one process for producing commercial vegetable pitches, the crude vegetable oil starting material is treated with aqueous caustic to remove the free fatty acids and other non-glyceride material. The thus removed reaction product, called raw soapstock, consists of soap, oil and non-glyceride material. The raw soapstock is treated with sulphuric acid or the like and the soaps are converted to free fatty acids and the product, called acid soapstock, consists of fatty acids, oil and non-glyceride material. The term "oil" is, of course, used to designate the fatty acid triglyceride. In general, the composition of vegetable oils and acid soapstock is as follows:

| Material | Percent Fatty Acids | Percent Glycerine (as Glycerides) | Percent Unsaponifiables |
|---|---|---|---|
| Vegetable Oils | 88–90 | 9–10 | 1–2 |
| Acid Soapstocks | 85–95 | 0.5–2 | 1–3 |

The vegetable oils, or the acid soapstocks, or both, are passed through a high-pressure continuous splitter. In the splitter, these materials are intimately mixed with water and steam at about 500° F. at 760 p. s. i. The water reacts with the glycerides to form free fatty acids and glycerine, which are separated. The resulting crude fatty acid fraction contains approximately 2% unsaponifiables, 4% glycerides and 94% free fatty acids. This fraction is then fed to a continuous fractionating still, where approximately 80% of the fraction is distilled overhead as fatty acids while the remainder is continuously removed from the bottom of the still as "still vegetable residue." The distillation is conducted at 2–5 mm. pressure and at a temperature of about 510° F., with a very small percentage of steam being injected into the base of the column. The average time during which the residue is subjected to these conditions is about four hours.

As mentioned above, vegetable pitch can be derived from cotton seed, corn and soybean oils. Each of these oils can be separately refined as above described to provide individual "still vegetable residues" or they can be premixed to form a composite feed resulting in a composite residue. In any event, it is the usual practice to use a mixture of the residues from these three oils as a feed for the pitch producing process.

Various vegetable pitches are produced by further stripping the mixed still residues in a batch still at 2–5 mm. pressure and at 480° F. for about eight hours. The stripping is continued, with removal of lighter overhead products, until the pitch or bottoms have the desired specifications. In one instance, Vegetable Pitch 250 is provided by continuing the distillation until the bottoms have a viscosity of 9–19 seconds at 165° C. in a Zahn $G_5$ cup. A light pitch can be obtained by stopping the stripping while the bottoms have a viscosity 8.5–10 seconds at 125° C. in a Zahn $G_5$ cup.

In the usual case, between 20% and 25% of the original still residue is removed as an overhead product of the batch distillation to produce the vegetable pitch. The sterols, hydrocarbons, alcohols, antioxidants, pigments, aldehydes, ketones, etc., which are originally present in the still residue are carried over to a certain extent to appear as a part of the pitch or bottoms product of the batch distillation. A goodly proportion of the original percentage of these materials will be degraded or converted to other forms in the various processing steps. Under the conditions of distillation, particularly of the batch distillation, the unsaturated fatty acids will polymerize and some fatty acids will be decarboxylated. Some fatty acid anhydrides and lactones will also be formed.

Thus, corn, cottonseed and soy oils contain relatively large proportions of unsaturated fatty acids. When treated by the above process, these acids polymerize, especially during the high-temperature distillation and stripping steps. This polymerization seems to be of importance in giving these products the qualities desired here, since it results in increasing the quantity of higher molecular weight (polymeric) materials present. A typical pitch which has been found to be excellent has the following typical composition:

*Vegetable Pitch 250*

| | |
|---|---|
| Unsaponifiable matter_____percent__ | 15 |
| Softening point, ball and ring_____° C__ | 35 |
| Acid value_____ | 55 (45 to 60) |
| Saponification value_____ | 130 (120–135) |
| Iodine value_____ | 80 (70 to 90) |
| Color (Barrett)_____ | 18 |

This particular pitch has a viscosity (Zahn $G_5$ orifice) within the range of 9 to 19 seconds at 165° C. It contains about 0.5% of moisture and volatile matter.

Another vegetable pitch which is obtained in the same general manner as Vegetable Pitch 250 but which is less preferable and contains less polymerized acids and more unsaponifiable material, has a typical composition as follows:

*Vegetable Pitch 150*

| | |
|---|---|
| Unsaponifiable matter_____percent__ | 23 |
| Softening point, ball and ring_____° C__ | 32 |
| Acid value_____ | 45 |
| Saponification value_____ | 125 |
| Iodine value_____ | 95 |
| Color (Barrett)_____ | 16 |

It has a viscosity (Zahn $G_5$ orifice) between 8.5 and 10.0 seconds at 125° C. This moisture and volatile components amount to about 0.5%.

Other pitches useful in accordance with this invention are the tall oil pitches. They are tacky, viscous, brown liquids produced from crude tall oil by the combined action of distillation and polymerization, the latter reaction being especially important to yield a product of increased molecular weight. They consist of a mixture of polymerized and monomeric rosin and fatty acids, rosin anhydrides, estolides, esters, hydrocarbons, aldehydes, ketones, sterols and sulfur lignin. One useful tall oil pitch has the following specifications:

| | |
|---|---|
| Viscosity (Zahn $G_3$ orifice at 125° C)____sec__ | 13 to 19 |
| Acid value_____ | 60 to 80 |
| Color (Barrett)_____ | 15 |
| Moisture and volatile_____percent__ | 0.5 |
| Rosin acids_____do____ | 22 |
| Unsaponifiable matter_____do____ | 22 |
| Softening point, ball and ring_____° C__ | 32 |
| Saponification value_____ | 115 |
| Iodine value_____ | 100 |
| Viscosity, poises at 125° C_____ | 1.5 |

Another tall oil pitch of slightly less desirable character has the following specifications:

| | |
|---|---|
| Viscosity (Zahn $G_3$ orifice at 125° C.)____sec__ | 9 to 15 |
| Acid value_____ | 80 to 100 |
| Color (Barrett)_____ | 14 |
| Moisture and volatile_____percent__ | 0.5 |
| Rosin acids_____do____ | 30 |
| Unsaponifiable matter_____do____ | 19 |
| Softening point, ball and ring_____° C__ | 32 |
| Saponification value_____ | 130 |
| Iodine value_____ | 90 |
| Viscosity, poises at 125° C_____ | 1.0 |

The above tall oil specifications are typical and for those values not listed as a range, it will be understood that they can deviate somewhat without the pitch losing all of its usefulness in this invention.

A solvent extraction product found to be useful is one prepared by solvent extracting cotton seed oil with propane or other light hydrocarbon solvent. There results a high molecular weight fraction comprising not more than 5% of the cotton seed oil and consisting principally of color bodies, gums and resins. Such a product is identified herein as "ebony fat" and may be prepared in the manner taught in U. S. Patent 2,521,234 to W. M. Leaders. One product which is commercially available and which is useful in this invention has the following specifications:

| | |
|---|---|
| Moisture_____ | 5%. |
| Iodine value_____ | 50 to 60. |
| Saponification value_____ | 180 to 200. |
| Unsaponifiables_____ | 1 to 3%. |
| Oxidized fat_____ | 15% approx. |
| Total fatty acid_____ | 70% approx. |
| Free fatty acid as oleic_____ | 20% approx. |

It is a liquid at room temperature.

PETROLEUM SULFONATE

The function of this material in the invert emulsion is to act as a thinning and smoothing agent, to facilitate the formation of the emulsion and to add to its resistivity to inversion to an oil-in-water emulsion. While it is possible to prepare some emulsion fluids without this ingredient, it is preferable to employ an amount within the range of 1 to 10 pounds per barrel of emulsion in order to secure the best emulsion.

The petroleum sulfonates useful in accordance with this invention can be termed the alkyl aryl sulfonates having a molecular weight such that the sulfonate is oleophilic, i. e., substantially soluble in oil. These petroleum sulfonates are obtained from the treatment of certain mineral hydrocarbon oils, such as lubestock, with sulfuric acid followed by neutralization with sodium hydroxide and one class of these compounds have the following chemical formulae: $C_nH_{2n-6}SO_3Na$ and $C_nH_{2n-12}SO_3Na$. These materials usually contain either a benzene or a naphthalene ring structure and each molecule is considered to have one reactive sulfonate group. The properties of the materials are in large measure established by the molecular weight in that those with the molecular weight above 400 are of the oil soluble type and those with a molecular weight less than 400 are the water soluble type. Of course, this invention employs those having a molecular weight greater than 400, i. e. "$n$" in the above formulae is larger than about 20. Suitable hydrocarbon sulfonates meeting the above requirements are available under the name "Petronate L."

EXTRACTED WOOD RESIN

This resin ingredient functions to permit satisfactory stable water-in-oil emulsions to be formed from water base muds containing water wet solids, such as clays and weighting materials and, more generally, to impart to the emulsion a wide range of tolerance toward solids.

In some instances, the original emulsion is prepared from fresh water and then solids are added, such as clays or weighting material. Usually these solids are dry and upon addition to the emulsion do not have the opportunity to become water wetted as they are when added to a water base mud. Nevertheless, they have a tendency to render an ordinary emulsion unstable and to settle therefrom. In such instances, this resin maintains the emulsion stable and prevents any appreciable settling of solids.

In other instances, a water base mud which already contains water wetted solids is added as the contributor of the water phase of the emulsion. In such cases, there has been noted a markedly greater difficulty in forming a satisfactory emulsion than when fresh water alone is used and the solids added later to the emulsion. In fact, some water base muds are of such nature that it is even difficult to form a water-in-oil emulsion of any kind. It has been found that the resin of this invention, particularly when employed in combination with an alkaline earth metal oxide or hydroxide (e. g. lime) as discussed below, has a pronounced ability to cause or permit satisfactory emulsions to be formed. This is true in particular with respect to the use of water base muds containing relatively large quantities of wetted solids. The data below indicates that it is the combined action of the resin and alkaline earth metal oxide or hydroxide in the formula which gives these desired results. Of course, there are some muds which can be made up into a satisfactory emulsion with little difficulty but even with respect to these, improvements in suspending properties are obtained by the use of the above noted combination. These improved suspending properties are also apparent when the emulsion is compounded from fresh water as distinguished from field muds. In some operations, the suspension of solids may not be so important so that in such instances, very little, if any, of the resin need be employed.

The feature of this invention by which suitable emulsions can be prepared from field muds is considered of considerable importance in that water base muds are usually readily available when a well is being drilled initially with the water base mud and is to be completed or drilled further with an invert type mud. In such instance, it is highly advantageous to be able to use the water base mud as the water phase in making up the invert mud. Further, the water base mud already contains clays and the like which supplies the invert mud or fluid with plastering agents to form a suitable sheath on the walls of a bore hole and frequently contains weighting materials so that these need not be wasted.

A preferred wood resin employed in this invention is commercially available under trade name "Vinsol." It is extracted from dead tree stumps (e. g. pine) or woods which have aged somewhat. It is believed that the particular resin (which is probably a mixture of resins) is formed during this aging process. In any event, the aged dead stumps are shredded into small chips and then extracted with an aromatic type solvent (e. g. benzene). This solvent is then distilled off and the non-volatile material is mixed with a two-phase solvent system consisting of gasoline and furfural. The resins of high abietic acid content and of good color are solubilized in the gasoline phase while the resin fractions which are heavy in color bodies and have phenol and ether-linkage type structures are solubilized in the furfural. The resin employed according to this invention is obtained from this furfural solvent fraction. It has a softening point of about 108° C. (ASTM ring and ball method) and is quite resistant to high temperatures. It contains from 4 to 5% abietic acid and has an acid number within the range of 90 to 100. Other typical analytical values for this resin are as follows:

| | |
|---|---|
| Saponification number | 165 |
| Unsaponifiable matter (ASTM D1065)__percent__ | 7.7 |
| Gasoline soluble_____do____ | 17 |
| Acetone insoluble_____do____ | 0.05 |
| Toluene insoluble (ASTM D269)_____do____ | 15 |
| Petroleum ether insoluble_____do____ | 98 |
| Methoxyl ($-OCH_3$) content (ASTM or AOAC) _____percent__ | 5.3 |
| Oxygen absorption (300 lb./sq. in., 7 days)_do____ | 0.25 |
| Density at 25° C_____ | 1.218 |
| Bulking density, lb./cu. ft., approximately: | |
| Flake _____ | 42 |
| Pulverized _____ | 40 |

It can be described as a surface-active wood resin extracted from aged wood and substantially insoluble in gasoline but soluble in furfural and aromatic solvents.

Other wood resins which are useful in this invention are those sold under the names Dresinate X, Dresinate XX, and Dresinate XXX. Dresinate X and Dresinate XX are derived from pale and dark rosins, respectively, by converting these rosins into sodium soaps and then spray drying the same. The Dresinate XXX is derived from a mixture of the dark rosin and belro resin which mixture has been converted to soaps and spray dried. The pale and dark rosins are reported to have acid numbers of approximately 170 and 152, respectively, and are recovered from the gasoline phase in the above described extraction of aged wood. The belro resin has an acid number of about 150. An amount of the above described wood resins within the range of 1 to 20, preferably 2 to 10, pounds per barrel of emulsion is desirable.

INORGANIC SALTS AND BASES

The inorganic salts and bases useful in this invention are those which can act as contributors of cations for reaction with the fatty acids, sulfonates, resins, etc., of the organic constituents to form oil soluble metal soaps and to aid in the formation and stabilization of the emulsions. These soaps are formed in situ in the liquid phase of the emulsion. The water soluble alkaline earth metal salts and alkaline earth metal oxides or hydroxides can be used as sources of the cations. Preferably, calcium chloride and calcium hydroxide respectively are employed due to their relatively low cost although barium salts and hydroxides can be used. The alkaline earth metal salt should be chosen to provide a quick solution in water and to afford free alkaline earth metal ions. The alkaline earth metal salts can be eliminated but the resulting emulsion will not be stable when loaded with water-wettable clay solids and, in fact, such emulsion when bentonite is added will be clabbery with the solids eventually settling out into a lumpy mass. However, when clays are to be absent from the emulsion in its use, the elimination of alkaline earth metal salts will result in a very stable emulsion useful in low temperature work and such emulsion is very stable with respect to barite weighting materials. However, it is definitely preferred to employ the alkaline earth metal salts to yield an all-around satisfactory product. An amount of this salt within the range of 2 to 15 pounds per barrel of emulsion is satisfactory with 5 to 10 pounds being preferred.

As for the alkaline earth metal oxide or hydroxide, calcium hydroxide (lime) is preferably employed. This material seems to increase the stability of the emulsion, and is particularly useful in this regard when the emulsion is to be used at high temperatures and with weighting materials and clays. It has been found that the higher the pH, the greater the heat stability of the emulsion, provided, of course, that the high pH is not induced by detrimental cations (e. g. sodium). It has also been found that the alkaline earth metal oxide or hydroxide acts with the wood resin to permit the formulation of suitable water-in-oil emulsions from field muds, particularly those muds containing considerable weighting material or clays. This action does not seem to be attributable to either the resin or the oxide or hydroxide alone but to their joint effect. An amount of calcium hydroxide within the range of 2 to 20, preferably 3 to 10, pounds per barrel of emulsion has been found to be satisfactory and equivalent amounts of other hydroxides or oxides of alkaline earth metal compounds can be employed.

CLAY INGREDIENT

The clay ingredient should have sufficient adsorptive powers to permit, with reasonable minimum concentrations of clay, adsorption on the clay of the liquid or tacky ingredients of the dry, free-flowing concentrate and to adsorb moisture collecting in the concentrate from the atmosphere or other sources. The clay must also be compatible with the other ingredients to form such a concentrate and, in this respect, properties of the clay other than its adsorptive powers per se seem to be of importance. For example, some clays do not yield a desirable concentrate in the presence of salt (sodium chloride).

One clay which has been found to be particularly suitable presently bears the trademark "Xact 811" and is Angelina County filter clay. It is found in pits in Angelina County, Texas, such as those approximately eight miles south of Zavalla, Texas, and then one and one-half miles west of U. S. Highway 69. Such pits are on the G. W. Norton Estate and the J. C. Everett survey and they are so identified on the official survey plat. Such clay has been analyzed to have the following properties:

Chemical analysis
[Percentage by weight.]

| | |
|---|---|
| Silica ($SiO_2$) | 65.63 |
| Aluminum oxide ($Al_2O_3$) | 29.23 |
| Ferric oxide ($Fe_2O_3$) | 1.37 |
| Ferrous oxide (FeO) | 0.42 |
| Calcium oxide (CaO) | 0.10 |
| Magnesium oxide (MgO) | 0.69 |
| Sodium oxide ($Na_2O$) | 0.46 |
| Potassium oxide ($K_2O$) | 0.28 |
| Phosphorous pentoxide ($P_2O_5$) | Absent |

Physical analysis

| | |
|---|---|
| Color | Light cream. |
| Moisture | Below 5.0%. |
| pH (10 g. in 100 cc. of distilled water) | 3.05–5.0. |
| Average particle size (surface mean diameter by air permeation) | 1–2 microns. |
| Particle size (dry screen test) | 93% through 325 mesh. |
| Bulk density (fluffed) | 37.0 lbs. per cubic foot. |
| Bulk density (compacted) | 50.0 lbs. per cubic foot. |

This clay is characterized by very low yield (substantially non-hydratable) and has considerable adsorptive power. It has been found to result in a dry, free-flowing concentrate with a minimum amount of the clay present (at least 10 pounds per barrel usually being satisfactory depending upon the amount of liquid or tacky ingredients present).

Other clays can also be employed. Among these is an adsorptive clay comprising predominantly calcium montmorillonite (sold under the trademark "Xact") and found, for example, in Angelina County, Texas, and on the W. C. Stanley survey approximately seven miles due south of Zavalla, Texas. It is classed as a drilling fluid clay and one having a higher yield and lower adsorptive power than Angelina County filter clay. Other clays which have been found to be satisfactory in many instances are those sold under the names "Baroco" and "High Yield." Each of these clays is a relatively low yield clay, such as calcium montmorillonite, which has by suitable treatment been up-graded to increase its yield. Kaolin and diatomaceous earth can also be employed.

Also, a clay sold under the name "Attasorb" is useful. This clay is an ultra fine (90–95% by weight finer than 10 microns) sorptive, calcined attapulgite (a fuller's earth) described chemically as a complex hydrated magnesium aluminum silicate having an approximate chemical analysis (volatile free basis) as follows:

| | Percent |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Other | 3.0 |

It has a pH within the range of 7.5–8.5 and an oil adsorption index of 125 to 130 by the ASTM rubout method.

At least 20 and as much as 40 weight percent of the entire formula should be clay but variation in the amount of liquid and tacky ingredients may permit variation from this range.

WATER PHASE

A feasible range for the water phase concentration can be from about 70 to about 10, preferably from about 70 to about 30, volume percent of the liquid emulsion. In general, the amount of water to be employed will depend upon the emulsion properties desired. For example, the use of water concentrations in the upper portion of the above range results in a well fluid which has a higher viscosity than that exhibited by fluid having water concentrations in the lower part of the range. When using thick low gravity oils it sometimes is desirable to keep the water content very low.

As hereinbefore indicated, water base muds can be employed as the source of the water phase in generally the same manner as ordinary water is employed although it is to be noted that the tolerance of the resulting emulsion to solids is somewhat less than that of an emulsion made up from plain water instead of a water base mud. In other words, a more stable emulsion results from making the emulsion from plain water and then adding solids, such as weighting materials, than from adding the solids with the water.

OIL PHASE

The concentrates and ingredients of this invention are operable to form suitable invert emulsions with either refined or crude oils. The amount of oil to be used will be equal, in volume percent, to 100 minus the volume percent of water to be employed; that is, the oil should be within the range 30 to 90, preferably 30 to 70, volume percent of the emulsion. While substantially any type of oil can be employed, it is, of course, advisable to select one which has a sufficiently low volatility that danger of flash fires, etc., around the rig are minimized.

As indicated above, the emulsion ingredients of this invention are efficacious in suppressing the fluorescence of oils forming the continuous phase of the emulsion. All of the ingredients by themselves are non-fluorescent except the petroleum sulfonate which exhibits rather strong fluorescent properties. Vegetable pitch exhibits some fluorescence when mixed with non-fluorescent oils even though by itself it does not. When the ingredients are employed to form an emulsion with oils exhibiting a very strong fluorescence, such as diesel oil, the resulting emulsion has fluorescent properties no stronger than those exhibited by emulsions containing the same ingredients but made with non-fluorescent oils. The exact reason for this action is not known but it is rather remarkable that a group of compounds which contain a fluorescing material can be mixed with a large quantity of highly fluorescent oil to form an emulsion which exhibits no more fluorescence than is the case when non-fluorescing oils are employed. This property eliminates the need to select non-fluorescent oils as the continuous phase where an invert emulsion is desired to be substantially of the non-fluorescent type.

ADDITIVE FOR REDUCING FLUID LOSS

It has been discovered that magnesium hydroxide oxide and salts, particularly the sulfate, are effective with the emulsion fluids of this invention to reduce the fluid loss therefrom. Other compounds so useful include magnesium oxide, magnesium chloride, magnesium hydroxide, and the like. This material must be employed as an additive; that is, must be incorporated in the emulsion fluid after the same has been formed. When magnesium sulfate is incorporated into the dry mix or emulsion ingredients before the emulsion is formed, a great deal of difficulty is encountered in making emulsions with field muds.

The magnesium salt, oxide or hydroxide is used in an effective amount to reduce the fluid loss to a desired value. In general, the amount to be employed should be within the range of 2 to 10 lbs. per barrel, preferably about 5 lbs. per barrel.

ILLUSTRATIVE DATA

A plurality of different concentrates were made up with the respective formulae of Table I below. Concentrates 1, 2, 4 and 5 were made up to be dry and free-flowing while number 3 was made up as a liquid.

TABLE I.—COMPOSITION OF CONCENTRATES EMPLOYED TO FORM EMULSIONS

[Concentration in parts by weight]

| Ingredient | Con. No. 1 | Con. No. 2 | Con. No. 3 | Con. No. 4 | Con. No. 5 |
|---|---|---|---|---|---|
| Vegetable Pitch 250 | 15.0 | 10.0 | | | 15.0 |
| Petronate L | 5.0 | 5.0 | 10.0 | 5.0 | |
| Vinsol Resin | 5.0 | | 5.0 | 5.0 | 5.0 |
| $CaCl_2$ | 10.0 | 10.0 | 5.0 | 5.0 | 10.0 |
| $Ca(OH)_2$ | 10.0 | 10.0 | 3.0 | 5.0 | 10.0 |
| Xact 811 | 15.0 | 20.0 | | 20.0 | 20.0 |
| Crude Tall Oil | | | | 10.0 | |
| | 60.0 | 55.0 | 23.0 | 50.0 | 60.0 |

HEAT STABILITY OF EMULSIONS

The concentrates set forth in Table I were made up into emulsions by adding the concentrate to the oil and then adding the water. Aliquot parts of the various emulsions were aged at elevated temperatures for at least seventy-two hours with the properties of the emulsions being measured at various intervals. The results of these tests are set forth in Table II. Under the columns headed by "Stab." (stability), there are shown readings taken on a stability meter. This measurement was made by means of a probe assembly placed in the emulsion sample and carrying two silver strip electrodes separated by a 1/8 inch gap. An increasing alternating potential was impressed across the electrodes until emulsion breakdown occurred, as evidenced by initial current flow. The voltage required for such flow is taken as a measure of the stability of the emulsion with the higher voltages indicating the more stable emulsions.

All of the emulsions containing concentrates Nos. 1, 2 and 4 were made up in the proportions of 40 lbs. per barrel of the concentrate, 40 volume percent diesel oil and 60 percent fresh water. Those containing concentrate No. 5 were made up to include 40 lbs. per barrel of concentrate, 50 volume percent diesel oil and 50 volume percent of fresh water. Those emulsions containing concentrate No. 3 were made from 40 lbs. per barrel of concentrate, 50 volume percent of fresh water and 50 volume percent of a mixed clay-water base stock.

as concentrate No. 6. Emulsions were prepared to contain 40 lbs. per barrel of the concentrate, 40 volume percent of diesel oil and 60 volume percent of water.

TABLE II.—HEAT STABILITY OF EMULSIONS

| Time (Hrs.) | Con. No. 1 (200° F.) | | | Con. No. 3 (200° F.) | | | Con. No. 4 (200° F.) | | |
|---|---|---|---|---|---|---|---|---|---|
| | Stab. | Vis. | Fl. L. | Stab. | Vis. | Fl. L. | Stab. | Vis. | Fl. L. |
| 0 | 195 | 170 | 0.0 | 243 | 78 | 0.0 | 162 | 79 | 0.0 |
| 4 | 50 | 107 | 0.1 oil | 75 | 93 | [1] 7.5 OW | 80 | 63 | 0.0 |
| 8 | 90 | 130 | 0.0 | 50 | 66 | 5.4 OW | 65 | 72 | 0.2 oil |
| 16 | 90 | 92 | 0.0 | 55 | 121 | 1.4 oil | 80 | 70 | 0.0 |
| 24 | 165 | 170 | 0.0 | 60 | 70 | 4.0 OW | 70 | 52 | 0.2 oil |
| 48 | 95 | 90 | 0.0 | 67 | 48 | 2.0 OW | 85 | 63 | 0.1 oil |
| 72 | 100 | 121 | 0.0 | 80 | 51 | 0.8 oil | 75 | 50 | 1.3 oil |

On weighting emulsion sample, weight material settled rapidly.

| Time (Hrs.) | Con. No. 6 (200° F.) | | | Con. No. 2 (225° F.) | | | Con. No. 3 (250° F.) | | |
|---|---|---|---|---|---|---|---|---|---|
| | Stab. | Vis. | Fl. L. | Stab. | Vis. | Fl. L. | Stab. | Vis. | Fl. L. |
| 0 | 345 | 129 | 0.6 oil | 156 | 112 | 0.0 | 243 | 78 | 0.0 |
| 4 | 192 | 70 | 0.0 | 60 | 101 | 0.1 oil | 50 | 47 | 7.9 OW |
| 8 | 174 | 73 | 0.0 | 90 | 119 | 0.0 | 60 | 50 | 3.0 OW |
| 16 | 159 | 70 | 0.0 | 80 | 108 | 0.0 | 100 | 52 | 1.0 oil |
| 24 | 135 | 72 | 0.1 oil | 65 | 111 | 0.0 | 60 | 65 | 3.8 OW |
| 48 | 100 | 83 | 0.0 | 156 | 124 | 0.0 | 75 | 55 | 0.9 oil |
| 72 | 165 | 78 | 0.2 oil | 150 | 128 | 0.1 oil | 50 | 54 | 1.6 OW |

| Time (Hrs.) | Con. No. 6 (250° F.) | | | Con. No. 1 (300° F.) | | | Con. No. 2 (300° F.) | | |
|---|---|---|---|---|---|---|---|---|---|
| | Stab. | Vis. | Fl. L. | Stab. | Vis. | Fl. L. | Stab. | Vis. | Fl. L. |
| 0 | 345 | 129 | 0.6 oil | 210 | 180 | 0.0 | 156 | 112 | 0.0 |
| 4 | 165 | 71 | 0.3 oil | 30 | 88 | 0.0 | 40 | 86 | 0.0 |
| 8 | 115 | 75 | 0.0 | 80 | 121 | 0.3 oil | 65 | 111 | 0.0 |
| 16 | 145 | 83 | 0.0 | 135 | 122 | 0.4 oil | 144 | 113 | 0.0 |
| 24 | 159 | 85 | 0.7 oil | 156 | 133 | 0.3 oil | 225 | 127 | 0.0 |
| 48 | 125 | 83 | 2.5 OW | 375 | 165 | 0.1 oil | 55 | 63 | 0.6 oil |
| 72 | 70 | 69 | 24 OW | 30 | 97 | 0.9 oil | 75 | 88 | 0.1 oil |

| Time (Hrs.) | Con. No. 3 (300° F.) | | | Con. No. 4 (300° F.) | | | Con. No. 5 (300° F.) | | |
|---|---|---|---|---|---|---|---|---|---|
| | Stab. | Vis. | Fl. L. | Stab. | Vis. | Fl. L. | Stab. | Vis. | Fl. L. |
| 0 | 243 | 78 | 0.0 | 162 | 79 | 0.0 | 450 | 103 | 0.0 |
| 4 | 45 | 45 | 2.2 OW | 75 | 53 | 0.5 oil | 180 | 130 | 0.2 oil |
| 8 | 120 | 52 | 0.5 oil | 50 | 34 | 0.7 oil | 80 | 117 | 0.6 oil |
| 16 | 92 | 70 | 1.0 oil | 55 | 20 | 0.0 | | | |
| 24 | 130 | 70 | 1.2 oil | 90 | 61 | 0.1 oil | 210 | 130 | 1.0 oil |
| 48 | 192 | 70 | [2] 1.0 E | 0 | 27 | 55.0 OW | 120 | [3] TTM | |
| 72 | 125 | 77 | 1.2 E | 0 | 24 | 108.0 OW | 150 | 91 | 1.8 oil |

On weighting emulsion sample, weight material settled rapidly.

| Time (Hrs.) | Con. No. 1 (350° F.) | | | Con. No. 2 (350° F.) | | | Con. No. 3 (350° F.) | | |
|---|---|---|---|---|---|---|---|---|---|
| | Stab. | Vis. | Fl. L. | Stab. | Vis. | Fl. L. | Stab. | Vis. | Fl. L. |
| 0 | 180 | 164 | 0.0 | 135 | 74 | 0.0 | 240 | 57 | 0.7 oil |
| 4 | 45 | 99 | 0.0 | 40 | 64 | 0.1 oil | 180 | 67 | 1.3 oil |
| 8 | 70 | 113 | 0.0 | 50 | 76 | 0.3 oil | 207 | 82 | 1.0 E |
| 16 | 70 | 89 | 0.2 oil | 20 | 64 | 0.4 oil | 240 | 72 | 1.3 oil |
| 24 | 45 | 98 | 0.0 | 40 | 64 | 0.6 oil | 240 | 77 | 1.0 E |
| 48 | 30 | 56 | 0.5 oil | 40 | 61 | 0.2 oil | 267 | 89 | 1.1 E |
| 72 | 30 | 46 | 0.5 oil | 40 | 50 | 0.3 oil | 225 | 111 | 2.0 OW |

| Time (Hrs.) | Con. No. 1 (400° F.) | | |
|---|---|---|---|
| | Stab. | Vis. | Fl. L. |
| 0 | 180 | 164 | 0.0 |
| 4 | 50 | 70 | 0.0 |
| 8 | 30 | 51 | 0.4 oil |
| 16 | 35 | 52 | 0.3 oil |
| 24 | 35 | 70 | 0.0 |
| 48 | 50 | 62 | 0.7 oil |
| 72 | 60 | 64 | 0.9 oil |

[1] OW means the filtrate was comprised of oil and water in separate phases.
[2] E means the filtrate was an emulsion.
[3] TTM means too thick to measure.

A commercially available dry, free-flowing concentrate containing lecithin was also tested and is herein denoted It will be noted that emulsions made from Con. No. 1 were stable for at least seventy-two hours at temperatures ranging from 200° F. to 400° F. While some of the tests resulted in fluid loss, the fluid loss in each instance centrate and 50 volume percent each of diesel oil and fresh water.

TABLE IV

| Weight of Emulsion | Con. No. 1 | | | Con. No. 2 | | | Con. No. 3 | | |
|---|---|---|---|---|---|---|---|---|---|
| | Stab. | Vis. | Fl. L. | Stab. | Vis. | Fl. L. | Stab. | Vis. | Fl. L. |
| Blank | 231 | 81 | 0.0 | 153 | 40 | 0.0 | 270 | 72 | 0.0 |
| 10#/gal | 225 | 93 | 0.0 | 165 | 52 | 0.0 | 279 | 89 | [1] 0.2 |
| 12#/gal | 225 | 120 | 0.0 | 165 | 67 | 0.0 | 294 | 111 | [1] 0.0 |
| 14#/gal | 225 | 170 | 0.0 | 189 | 99 | 0.0 | 255 | 136 | 0.0 |
| 16#/gal | 207 | 255 | 0.0 | 168 | 143 | 0.0 | 249 | 209 | 0.2 oil |
| 18#/gal | 180 | 400 | 0.0 | 165 | 754 | 0.3 oil | 243 | 243 | 0.4 oil | was less than 1 cc. and was all oil. Emulsions made from Con. No. 2 likewise exhibited satisfactory heat stability but the other concentrates were not satisfactory either because the emulsions broke down, exhibited high viscosity or poor ability to suspend weighting materials. A comparison of the tests of concentrates Nos. 1, 2, 4 and 5 indicates that both vegetable pitch and Petronate L are required to yield a stable emulsion inasmuch as emulsions made from concentrate No. 4 (without vegetable pitch) broke down at 300° F. while those formulated from concentrate No. 5 (without Petronate L) became too thick to measure. This indicates the thinning action of this material.

To demonstrate the outstanding filtration characteristics of Con. No. 1 when made up into emulsion which is exposed to high pressures, a series of comparative tests were run to determine the fluid loss at 500 p. s. i. differential instead of the conventional 100 p. s. i. The results of these tests are shown in Table III. Each of these emulsions was compounded from 40 lbs. per barrel of the indicated concentrate, 40 volume percent of diesel oil and 60 volume percent of fresh water.

| Weight of Emulsion | Con. No. 6 | | |
|---|---|---|---|
| | Stab. | Vis. | Fl. L. |
| Blank | 255 | 115 | 0.0 |
| 12#/gal | 105 | 126 | 0.0 |
| 13#/gal | 80 | 141 | 0.9 OW |
| 14#/gal | Inverted to oil in water emulsion | | |

[1] Settling observed.

TABLE III.— HIGH TEMPERATURE-PRESSURE FLUID LOSS, 500 P. S. I.

| Temp. | Con. No. 1 | | | Con. No. 2 | | |
|---|---|---|---|---|---|---|
| | Stab.-Vis. | 30' Fl. L. | 60' Fl. L. | Stab.-Vis. | 30' Fl. L. | 60' Fl. L. |
| Room Temp | 180-164 | 0.0 | 0.0 | 135-83 | 0.0 | 0.0 |
| 150° F | | | | | 0.5 E | 0.5 E |
| 200° F | | | | | 0.5 E | 1.3 E |
| 250° F | | | | | 0.5 E | 1.4 E |
| 300° F | | 2.1 E | 3.1 E | | 2.8 E | 3.2 E |

| Temp. | Con. No. 3 | | |
|---|---|---|---|
| | Stab.-Vis. | 30' Fl. L. | 60' Fl. L. |
| Room Temp | 270-51 | 0.6 oil | 1.0 oil |
| 150° F | | | |
| 200° F | | | 3.0 OW |
| 250° F | | | 9.2 OW-E |
| 300° F | | | 42.0 OW-E |

TEMPERATURE STABILITY OF HIGH WEIGHT EMULSIONS

To illustrate that the preferred emulsion of this invention can be weighted to high gravities and yet be stable when heated, 40 lbs. per barrel of concentrate No. 1 was made up with 55 volume percent diesel oil and 45 volume percent water. The resulting emulsion was then weighted to 17 pounds per gallon with barite and heated to 350° F. The following results were obtained:

| Heating, Hours | Stab. | Vis. | Fl. L. |
|---|---|---|---|
| 0 | 249 | 145 | 0.0 |
| 4 | 270 | 255 | 0.2 oil |
| 24 | 75 | over 200 | 0.0 |
| 48 | 80 | over 200 | 0.3 oil |
| 98 | 90 | over 200 | 0.3 oil |

WEIGHT STABILITY AND SUSPENSION

Emulsions formed in accordance with this invention exhibit a satisfactory capacity to affect the suspension of weighting materials without permitting the same to settle. This is demonstrated in Table IV and in considering the results shown in the table, it must be borne in mind that the high viscosities shown for the heavier weight muds would be reduced for general field use. Usually this can be done simply by adding oil. Accordingly, the ability of the various emulsions to suspend the weighting materials at viscosities in a working field range should be considered to be of paramount importance. In Table IV, the weight of the emulsions was increased to the amount indicated in the table by the addition of barite. Each of the emulsions was compounded from 40 lbs. per barrel of the indicated concentrate

EFFECT OF CONTAMINANTS

The effect of various contaminants which might be expected to be encountered in well operations was determined. In general, cement and anhydrite (gypsum) had no effect at all. Salt lowers the emulsion's stability considerably and causes a fluid loss increase in a certain concentration range. This increase can be overcome with a treating agent described in detail later.

Caustic acts as a thinning agent for the emulsion fluid and does not destroy its heat stability. It therefore can be used as a viscosity reducing agent.

Hot saturated salt water has no significant detrimental effect other than that which would reasonably be expected by increasing the water content of an emulsion. Limited additions of bentonite lowers stability and increases viscosity; however, the emulsion remains stable. The effect of the various contaminants are shown in Table V. The emulsions were made from 40 lbs. per barrel of the indicated concentrate, 40 volume percent of diesel oil and 60 volume percent of fresh water, except as indicated.

TABLE V.—EFFECT OF ORDINARY CONTAMINANTS

CAUSTIC

| Amount Caustic | Con. No. 1 | | | Con. No. 2 | | |
|---|---|---|---|---|---|---|
| | Stab. | Vis. | Fl. L. | Stab. | Vis. | Fl. L. |
| 0 | 210 | 180 | 0.0 | 110 | 86 | 0.0 |
| 1#/bbl | 210 | 143 | 0.0 | 100 | 78 | 0.0 |
| 3#/bbl | 135 | 106 | 0.0 | 70 | 66 | 0.0 |
| 5#/bbl | 90 | 95 | 0.0 | 60 | 59 | 0.0 |
| 10#/bbl | 90 | 76 | 0.0 | 70 | 56 | 0.0 |
| 3#/bbl [1] | 140 | 114 | 0.0 | | | |

| Amount Caustic | Con. No. 6 | | |
|---|---|---|---|
| | Stab. | Vis. | Fl. L. |
| 0 | 100 | 75 | 0.0 |
| 1#/bbl | 115 | 71 | 0.0 |
| 2#/bbl | 100 | 70 | 0.0 |
| 3#/bbl | 90 | 81 | 9.0 OW |
| 5#/bbl | 20 | 61 | 16.6 OW |

CEMENT

| Amount Cement | Con. No. 1 | | | Con. No. 2 | | |
|---|---|---|---|---|---|---|
| | Stab. | Vis. | Fl. L. | Stab. | Vis. | Fl. L. |
| 0 | 180 | 164 | 0.0 | 110 | 86 | 0.0 |
| 1#/bbl | 180 | 146 | 0.0 | 110 | 85 | 0.0 |
| 3#/bbl | 180 | 151 | 0.0 | 105 | 83 | 0.0 |
| 5#/bbl | 180 | 166 | 0.1 oil | 105 | 84 | 0.0 |
| 10#/bbl | 180 | 170 | 0.3 oil | | | |

| Amount Cement | Con. No. 6 [2] | | |
|---|---|---|---|
| | Stab. | Vis. | Fl. L. |
| 0 | 195 | 57 | 0.4 oil |
| 2#/bbl | 240 | 40 | 0.4 oil |
| 5#/bbl | 195 | 37 | 0.7 E |
| 10#/bbl | 165 | 33 | 0.0 |

BENTONITE

| Amount Bentonite | Con. No. 1 | | | Con. No. 2 | | |
|---|---|---|---|---|---|---|
| | Stab. | Vis. | Fl. L. | Stab. | Vis. | Fl. L. |
| 0 | 180 | 164 | 0.0 | 150 | 102 | 0.0 |
| 10#/bbl | 75 | 139 | 0.0 | 156 | 87 | 0.0 |
| 20#/bbl | 50 | 140 | 0.4 oil | 45 | 97 | 0.0 |
| 30#/bbl | 55 | 210 | 0.0 | 40 | 84 | 0.0 |
| 40#/bbl | 50 | 213 | 0.0 | 0 | | |

| Amount Bentonite | Con. No. 6 [2] | | |
|---|---|---|---|
| | Stab. | Vis. | Fl. L. |
| 0 | 195 | 57 | 0.4 oil |
| 40#/bbl | 180 | 55 | 1.0 oil |
| 60#/bbl | 135 | 91 | 0.1 oil |
| 70#/bbl | 10 | 102 | 1.2 oil |
| 90#/bbl | Inverted to oil in water emulsion | | |

HOT SATURATED SALT WATER

| Amount H. S. S. W. | Con. No. 1 | | | Con. No. 2 | | |
|---|---|---|---|---|---|---|
| | Stab. | Vis. | Fl. L. | Stab. | Vis. | Fl. L. |
| 0 | 180 | 164 | 0.0 | 135 | 83 | 0.0 |
| 10% | 225 | 190 | 0.0 | 55 | 71 | 0.0 |
| 20% | 153 | 285 | 0.0 | 45 | 80 | 0.0 |
| 30% | 95 | 329 | 0.0 | 10 | 91 | 0.0 |
| 40% | 30 | 322 | 0.0 | 10 | 119 | 0.0 |
| 50% | | | | 10 | 137 | 0.0 |

SALT

| Amount Salt | Con. No. 1 | | | Con. No. 2 | | |
|---|---|---|---|---|---|---|
| | Stab. | Vis. | Fl. L. | Stab. | Vis. | Fl. L. |
| 0 | 210 | 180 | 0.0 | 110 | 86 | 0.0 |
| 25#/bbl | 30 | 97 | 0.0 | 70 | 62 | 0.0 |
| 50#/bbl | 30 | 108 | 1.0 OW | 60 | 62 | 0.0 |
| 75#/bbl | 30 | 128 | 0.9 OW | 40 | 68 | 0.0 |
| 100#/bbl | 45 | 121 | 0.0 | 35 | 74 | 0.0 |
| 125#/bbl | 30 | 115 | 0.0 | 30 | 84 | 0.0 |
| 150#/bbl | 30 | 135 | 0.0 | | | |

| Amount Salt | Con. No. 6 | | |
|---|---|---|---|
| | Stab. | Vis. | Fl. L. |
| 0 | 100 | 75 | 0.0 |
| 10#/bbl | 85 | 66 | 0.0 |
| 40#/bbl | 55 | 69 | 0.0 |
| 80#/bbl | 35 | 74 | 0.0 |

ANHYDRITE

| Amount Anhydrite | Con. No. 1 | | | Con. No. 2 | | |
|---|---|---|---|---|---|---|
| | Stab. | Vis. | Fl. L. | Stab. | Vis. | Fl. L. |
| 0 | 180 | 164 | 0.0 | 110 | 86 | 0.0 |
| 1#/bbl | 180 | 160 | 0.0 | 105 | 83 | 0.0 |
| 3#/bbl | 180 | 162 | 0.0 | 100 | 83 | 0.0 |
| 5#/bbl | 192 | 163 | 0.2 oil | 110 | 83 | 0.0 |
| 10#/bbl | 195 | 164 | 0.0 | | | |

| Amount Anhydrite | Con. No. 6 [2] | | |
|---|---|---|---|
| | Stab. | Vis. | Fl. L. |
| 0 | 195 | 57 | 0.4 oil |
| 2#/bbl | 85 | 30 | 0.2 oil |
| 5#/bbl | 150 | 31 | 0.1 oil |
| 10#/bbl | 60 | 28 | 0.3 oil |

[1] Heated 48 hours at 300° F.
[2] Emulsion contained 40 lbs./bbl. concentrate, 50 volume percent diesel oil and 50 volume percent fresh water.

When using the preferred formula, and upon adding bentonite or other hydratable clays, the emulsions tend to thicken and in some instances to squeeze out water. However, there is no perceptible settling nor any "flipping over" to an oil in water emulsion. The thickened emulsions can be brought back to their original condition simply by adding a small amount of oil (10%), a small amount of formula (e. g. 10 pounds per barrel) and re-weighting to the original weight.

*Range of workability*

As indicated above, the preferred dry concentrate can be employed in a concentration within the range of 20 to 70 lbs. of the concentrate per barrel of emulsion. The effect of varying quantities of Con. Nos. 1 and 2 upon an emulsion comprising 40% diesel oil and 60% water is shown in Table VI.

TABLE VI

| Amt. Con. | Con. No. 1 | | | Con. No. 2 | | |
|---|---|---|---|---|---|---|
| | Stab. | Vis. | Fl. L. | Stab. | Vis. | Fl. L. |
| 10#/bbl | | | | 25 | 21 | 2.0 OW |
| 20#/bbl | 180 | 90 | 0.9 oil | 75 | 60 | 0.8 oil |
| 30#/bbl | 225 | 102 | 0.1 oil | 156 | 73 | 0.0 |
| 40#/bbl | 180 | 135 | 0.0 | 165 | 82 | 0.0 |
| 50#/bbl | 255 | 215 | 0.0 | 174 | 90 | 0.0 |
| 60#/bbl | 240 | 285 | 0.0 | | | |

Also, as indicated above, working range for the concentration of the oil in the emulsion is desirably 30 to 90% oil with the balance being water, i. e., 70 to 10% water. The effect of varying the oil to water ratio in the emulsion is indicated in Table VII. The tests of this table were run employing 40 lbs. of Con. Nos. 1 and 2, respectively, per barrel of emulsion. Diesel oil was used as the oil phase and fresh water as the water phase.

TABLE VII

| Percent Oil-Water | Con. No. 1 | | | Con. No. 2 | | |
|---|---|---|---|---|---|---|
| | Stab. | Vis. | Fl. L. | Stab. | Vis. | Fl. L. |
| 30%-70% | 135 | 310 | 0.0 | 180 | 275 | 0.0 |
| 40%-60% | 180 | 135 | 0.0 | 216 | 115 | 0.0 |
| 50%-50% | 270 | 60 | 0.0 | 210 | 47 | 0.0 |
| 60%-40% | 300 | 28 | 0.0 | 255 | 21 | 0.0 |
| 70%-30% | 345 | 15 | 0.0 | 255 | 12 | 0.0 |

*Variation of Petronate L and Vinsol Resin in formula*

A plurality of emulsions were prepared with 50% diesel oil and 50% Texas high pH lime mud from the field and having the following properties:

| | |
|---|---|
| Weight | lbs./gal__ 14.5 |
| Vis. (Fann) | centipoises__ 40 |
| Water | percent__ 59 |
| Solids | do____ 28 |
| Oil | do____ 13 |
| pH | 13 |

A plurality of portions of a base each comprising:

| | Parts by weight |
|---|---|
| $CaCl_2$ | 10 |
| $Ca(OH)_2$ | 10 |
| Xact 811 | 15 | were made up and then various ones and amounts of the ingredients listed in the column entitled "Ingredients" in Table VIII were added to the respective portions. The resulting mixtures were added to the respective portions of the above emulsions at the rate of 40 lbs./bbl.

EFFECT ON MUD OF RESIN AND ALKALINE EARTH METAL BASE

To study the effect of the wood resin and alkaline earth metal base in emulsions compounded from field muds, a Texas red lime mud was selected which exhibited strong resistance to being made up into a water-in-oil emulsion. This particular mud had a weight of 17 pounds per gallon, a pH of 12 and contained about ½ pound per barrel of lime. In attempting to make up the emulsions, 50 volume percent of this mud and 50 volume percent of diesel oil were employed.

Using the preferred formula, 40 pounds per barrel of the same failed to permit a water-in-oil emulsion to be formed. Forty pounds per barrel equivalent of the preferred formula then had added 2.9 pounds per barrel of Vinsol resin. The resulting concentrate still failed to give a water-in-oil emulsion. The same procedure was repeated adding the Vinsol resin in increments of 2.9 pounds per barrel until a total of 17.4 pounds per barrel had been added. In no case was a water-in-oil emulsion formed.

Forty pounds of the preferred formula was then mixed with 2.9 pounds per barrel of Vinsol resin and 5 pounds per barrel of lime. The resulting concentrate gave a satisfactory water-in-oil emulsion. A concentrate was then made up to be the same as the preferred formula except that the Vinsol resin was omitted and an additional 5 pounds per barrel of lime added. The resulting concentrate gave an oil-in-water emulsion.

An emulsion was then made up using the preferred formula to which an additional 5 pounds per barrel of lime had been added. The resulting emulsion was water-in-oil and appeared satisfactory.

From the above, it can be seen that with at least some muds, it is the combination of resin and alkaline earth metal base which permits satisfactory emulsions to be formed.

*Effect of $MgSO_4$ and field muds*

An important advantage of the emulsions of this invention is that they can be made up employing ordi-

TABLE VIII

| | Ingredients, Parts by Weight | Ease of Emulsion Preparation | Stab. | Vis. | Fl. L. | Settling of Weight Material in 24 hours [1] |
|---|---|---|---|---|---|---|
| 1 | 15 Vegetable Pitch 250 | No emulsion could be formed | | | | Yes. |
| 2 | 15 Vegetable Pitch 250, 5 Vinsol Resin. | Easy | 120 | 58 | 0.0 | Yes. |
| 3 | 15 Vegetable Pitch 250, 5 Petronate L. | No emulsion could be formed | | | | |
| 4 | 15 Vegetable Pitch 250, 5 Vinsol Resin, 5 Petronate L. | Easy | 40 | 46 | 0.0 | Yes. |
| 5 | 15 Vegetable Pitch 250, 10 Vinsol Resin. | ___do___ | 150 | 58 | 0.1 oil | No. |
| 6 | 15 Vegetable Pitch 250 10 Petronate L. | ___do___ | 45 | 47 | 0.3 oil | Yes. |
| 7 | 15 Vegetable Pitch 250, 10 Vinsol Resin, 5 Petronate L. | ___do___ | 55 | 60 | 0.0 | No. |

[1] Weight material derived from mud with no additional weight material added.

It will be recognized that water-in-oil emulsions are difficult to form with such types of muds and that for this particular mud, the proportion of ingredients listed under item 7 would be preferred although those listed under item 5 seemed to be satisfactory at room temperature. However, it will be recalled that emulsions prepared without Petronate L tend to become very thick at elevated temperatures.

nary water base field drilling muds as contributors of the water phase. These muds, of course, contain the usual clay material so that such material is likewise incorporated in the emulsion fluids. To demonstrate the ability of emulsions being made up with field muds, the tests shown in Table IX were run. These tests also illustrate the effect of magnesium sulfate on the fluid loss.

TABLE IX

| Water Base [1] Field Mud | Weight, p. p. g. | Con. No. 1 | | | Con. No.. 1, Plus [2] 5 lbs./bbl. MgSO4 | | |
|---|---|---|---|---|---|---|---|
| | | Stab. | Vis. | Fl. L. | Stab. | Vis. | Fl. L. |
| No. 1 | 9.7 | 100 | 83 | 0.8 oil | 65 | 83 | 0.3 oil |
| No. 2 | 9.8 | 70 | 61 | 1.0 oil | 65 | 63 | 0.0 |
| No. 3 | 10.0 | 85 | 84 | 0.9 oil | 60 | 76 | 0.3 oil |
| No. 4 | 10.1 | 70 | 86 | 0.6 oil | 55 | 84 | 0.3 oil |
| No. 5 | 15.0 | 45 | 74 | 0.3 oil | | | |
| No. 6 | 14.5 | 65 | 41 | 0.0 | 120 | 53 | 0.0 |

| Water Base [1] Field Mud | Weight, p. p. g. | Con. No. 2 | | | Con. No.. 2, Plus [2] 3 lbs./bbl. MgSO4 | | |
|---|---|---|---|---|---|---|---|
| | | Stab. | Vis. | Fl. L. | Stab. | Vis. | Fl. L. |
| No. 1 | 9.7 | [3] 35 | 64 | 2.6 OW | [3] 35 | 58 | 0.4 oil |
| No. 2 | 9.8 | [3] 50 | 40 | 2.8 OW | [3] 45 | 45 | 0.7 oil |
| No. 3 | 10.0 | [3] 55 | 69 | 3.0 OW | [3] 40 | 54 | 0.7 oil |
| No. 4 | 10.1 | [3] 50 | 81 | 2.8 OW | [3] 25 | 47 | 0.3 oil |
| No. 5 | 15.0 | No Emulsion Formed | | | No Emulsion Formed | | |
| No. 6 | 14.5 | [3] 30 | 45 | 0.0 | | | |

[1] The emulsion was composed of 50 vol. percent each of the indicated water base field mud and of diesel oil. 40 lbs. per barrel of concentrate was used in each instance.
[2] The MgSO4 was added to the emulsion after it was formed and stabilized with the concentrate.
[3] Settling of weight material observed.

It should be noted that if the original emulsion is prepared with ordinary water and oil, weighting materials can easily be introduced thereafter without any appreciable settling. However, if water base muds containing weighting materials are employed in place of ordinary water in making up the emulsions, then it is much more difficult to prevent settling of the weighting materials.

EFFECT OF ELIMINATING ALKALINE EARTH METAL SALTS

A dry concentrate comprising 15 parts of Vegetable Pitch 250, 5 parts of Petronate L, 5 parts of Vinsol resin, 10 parts of lime and 20 parts of Xact 811 clay was prepared. Forty pounds per barrel of this concentrate was employed to make up an emulsion containing 40 volume percent of diesel oil and 60 volume percent of fresh water. The resulting emulsions were heated at the temperatures indicated in Table X and their properties measured.

TABLE X

| Time (Hrs.) | Stab. | (350° F.) Vis. | Fl. L. | Gels, initial/10 min. |
|---|---|---|---|---|
| 0 | 70 | 92 | 0.0 | 2/2 |
| 4 | 110 | 150 | 0.0 | 1/1 |
| 8 | 75 | 106 | 0.2 oil | 0/0 |
| 16 | 30 | 46 | 0.3 oil | 1/2 |
| 24 | 85 | 57 | 0.0 | 0/1 |
| 48 | 85 | 76 | 0.0 | 0/1 |
| 72 | 105 | 77 | 2.4 OW | 0/0 |

| Time (Hrs.) | Stab. | (400° F.) Vis. | Fl. L. | Gels, initial/10 min. |
|---|---|---|---|---|
| 0 | 70 | 92 | 0.0 | 2/2 |
| 4 | 45 | 66 | 0.0 | 1/2 |
| 8 | 85 | 69 | 0.5 oil | 0/1 |
| 16 | 95 | 63 | 3.5 OW | 0/2 |
| 24 | 80 | 85 | 1.8 OW | 4/5 |
| 48 | 60 | 79 | 6.6 OW | 0/0 |
| 72 | 100 | 95 | 7.2 OW | 0/0 |

It will be seen that the stability of the emulsion, particularly at 400°, was markedly less than the emulsions containing calcium chloride.

To test the stability of heated and weighted emulsions using the same formula as was employed with respect to the data in Table X, 40 pounds per barrel of the formula was made up into an emulsion containing 50 volume percent of diesel oil and 50 volume percent of fresh water. The emulsion was then weighted with barite to 17 pounds per gallon and heated with its properties measured at the time intervals indicated in Table XI.

TABLE XI

| Time (Hrs.) | Stab. | (300° F.) Vis. | Fl. L. | Gels, initial/10 min. |
|---|---|---|---|---|
| 0 | 65 | 185 | 0.4 oil | 0/0 |
| 4 | 360 | 330 | 0.0 | 2/2 |
| 8 | 450 | 310 | 0.0 | 0/1 |
| 16 | 340 | 435 | 0.5 oil | 0/0 |
| 24 | 400 | 360 | 0.4 oil | 0/3 |
| 48 | 165 | 314 | 0.0 | 2/4 |
| 72 | 255 | | 0.4 oil | |

It will be noted that the emulsion exhibited very high stability and though there was some fluid loss, it was all oil. The heated emulsion, particularly at the longer time intervals, exhibited a tendency for water to be squeezed therefrom. The viscosity measurement at 72 hrs. was not taken because such water prevented accurate measurement.

EMULSIONS FORMED WITH DRESINATE FORMULAS

Four dry concentrates were made up to contain 10 parts of Dresinate X, Dresinate XX, Dresinate XXX and Vinsol resin, respectively. Each also contained 15 parts of Vegetable Pitch 250, 5 parts of Petronate L, 18 parts of lime, 10 parts of calcium chloride, and 25 parts of Xact 81. Emulsions were made with 47½ pounds per barrel of each concentrate and 50 volume percent of diesel oil and 50 volume percent of Texas red lime water base mud. This mud had a weight of 17.9 pounds per gallon, a pH of 12 and contained about ½ pound per barrel of lime. It had exhibited a strong aversion to be made up into water-in-oil emulsions. Each of the concentrates easily gave a water-in-oil emulsion.

*Method of mixing dry concentrate*

As indicated above, the preferred method of mixing the dry concentrate is to intermix the clay, Vinsol resin, and lime and then to add the calcium chloride. The vegetable pitch and Petronate L should then be mixed together, heated to 200 to 250° F. and then added to the intermixture of clay, etc. It has been found that by following this procedure, a superior emulsion can be formed as contrasted to emulsions formed from dry concentrates in which (1) the vegetable pitch is added first to the clay, etc., followed by the Petronate L, or (2) the Petronate L is added first to the clay, etc., followed by the vegetable pitch. The results shown in Table XII indicate this superiority. Modes 1 and 2 in the table denote that the concentrates were made up according to the procedure of items (1) and (2) explained above. The concentrate indicated by mode 3 was made up by mixing the vegetable pitch and Petronate L together and then adding the mixture to the clay, etc. The emulsions were formed employing 40 lbs. per barrel of the respective concentrate, 40 volume percent of diesel oil and 60 volume percent of fresh water.

TABLE XII

| Mode | Stab. | Vis. | Gels. | Fl. L. | pH [1] |
|---|---|---|---|---|---|
| (1) | 312 | 291 | 17/83 | 0.0 | 12.1 |
| (2) | 285 | 265 | 11/54 | 0.0 | 12.1 |
| (3) | 330 | 345 | 20/77 | 0.0 | 11.9 |

[1] 5 grams of concentrate in 50 grams of distilled water.

The concentrates made according to modes (1) and (2) were somewhat gummy while that of mode (3) was dry and free flowing. Such gumminess may be eliminated by increasing the clay concentration.

Concentrates were made up in accordance with the preferred formula given above except that sodium chloride and barium chloride were respectively used to replace the calcium chloride. The sodium chloride concentrate was gummy in nature thereby indicating that something more is involved in forming a dry, free-flowing concentrate than mere adsorption of liquids. The barium chloride concentrate was somewhat troublesome to form but was not nearly as gummy as the sodium chloride concentrate.

Fluorescence of emulsions

A series of tests were run to determine the fluorescent properties of the individual components of the preferred formula, of the formula itself and of emulsions prepared from the formula with diesel oil and non-fluorescent oils. Only the Petronate L of the formula components showed any fluorescence. The vegetable pitch did not fluoresce in a solid mass but did have some slight fluorescence when dissolved in non-fluorescing oils. The preferred formula did not exhibit fluorescence alone but when mixed with non-fluorescent oils, a slight fluorescence was noted.

Emulsions were prepared from the preferred formula with the following oils and the fluorescence noted:

No Glo _____ Slight fluorescence.
Humble 200 Kerosene _____ Slight fluorescence.
Shell Petro Sho _____ Slight fluorescence.
Diesel oil _____ Slight fluorescence.

The fluorescence in all cases was substantially equal. More important, the fluorescence of the emulsion made with highly fluorescent diesel oil was no greater than that of emulsions made with nonfluorescent oils.

All reference to test procedure and to test results except those relating to "Stability," are made with respect to API Recommended Practice 29, third edition, May 1950.

From the foregoing it will be seen that this invention is one well adapted to attain all of the ends and objects hereinabove set forth, together with other advantages which are obvious and which are inherent to the process and composition.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

The invention having been described, what is claimed is:

1. A stable water-in-oil emulsion fluid for use in well operations consisting essentially of from about 10 to about 70 parts by volume of water and about 90 to about 30 parts by volume of oil, from 4 to 30 lbs. per barrel of vegetable pitch consisting of a crude material obtained in the processing of vegetable oil, said material having a higher molecular weight than said vegetable oil and containing polymers of fatty acids which acids are derived from said vegetable oil, from 1 to 10 lbs. per barrel of oleophilic hydrocarbon sulfonate, from 1 to 20 lbs. per barrel of a surface-active wood resin extracted from aged wood and substantially insoluble in gasoline but soluble in furfural, from 2 to 15 lbs. per barrel of a water soluble alkaline earth metal salt and from 2 to 20 lbs. per barrel of an alkaline earth metal base.

2. The emulsion fluid of claim 1 wherein said vegetable pitch has an acid value in the range of 45 to 60, a saponification value in the range of 120 to 135, and an iodine value in the range of 70 to 90.

3. The emulsion fluid of claim 1 in combination with a fluid loss reducing additive selected from the class consisting of magnesium oxide, magnesium hydroxide and a magnesium salt, said additive being present in an amount sufficient to reduce the fluid loss of said emulsion fluid.

4. The emulsion of claim 2 wherein said hydrocarbon sulfonate has a molecular weight of at least 400.

5. A stable water-in-oil emulsion fluid for use in well operations consisting essentially of a water-in-oil emulsion stabilized with 4 to 30 lbs. per barrel of vegetable pitch consisting of a crude material obtained in the processing of vegetable oil, said material having a higher molecular weight than said vegetable oil and containing polymers of fatty acids which acids are derived from said vegetable oil, 1 to 10 lbs. per barrel of oleophilic hydrocarbon sulfonate, 2 to 15 lbs. per barrel of a water soluble alkaline earth metal salt and 2 to 20 lbs. per barrel of an alkaline earth metal base.

6. The emulsion of claim 5 wherein said vegetable pitch has an acid value in the range of 45 to 60, and a saponification value in the range of 120 to 135.

7. The emulsion fluid of claim 5 wherein there is included 1 to 20 lbs. per barrel of a surface active wood resin selected from the class consisting of a resin extracted from aged wood and substantially insoluble in gasoline but soluble in furfural, and sodium soaps of resins extracted from aged wood.

8. The emulsion fluid of claim 5 in combination with a fluid loss reducing additive comprising magnesium sulfate, said additive being present in an amount sufficient to reduce the fluid loss of said emulsion fluid.

9. A stable water-in-oil emulsion fluid for use in well operations consisting essentially of about 10 to about 70 parts by volume of water and about 90 to about 30 parts by volume of oil, 5 to 20 lbs. per barrel of vegetable pitch consisting of a crude material obtained in the processing of vegetable oil, said material having a higher molecular weight than said vegetable oil and containing polymers of fatty acids which acids are derived from said vegetable oil, 1 to 10 lbs. per barrel of oleophilic hydrocarbon sulfonate, 2 to 10 lbs. per barrel of a surface active wood resin selected from the class consisting of a resin extracted from aged wood and substantially insoluble in gasoline but soluble in furfural and alkali metal soaps of resins extracted from aged wood, and about 3 to 10 lbs. per barrel of an alkaline earth metal base.

10. The emulsion fluid of claim 9 in combination with a fluid loss reducing additive comprising magnesium sulfate, said additive being present in an amount sufficient to reduce the fluid loss of said emulsion fluid.

11. The emulsion fluid of claim 10 wherein said additive is present in an amount in the range of 2 to 10 lbs. per barrel.

12. A dry, free-flowing concentrate for adding to water and oil to prepare a water-in-oil emulsion fluid for use in wells, consisting essentially of an intimate admixture of finely ground adsorptive mineral selected from the group consisting of Angelina County filter clay, kaolin, diatomaceous earth and calcined attapulgite, and of ingredients including vegetable pitch consisting of a crude material obtained in the processing of vegetable oil, said material having a higher molecular weight than said vegetable oil and containing polymers of fatty acids which acids are derived from said vegetable oil, an oleophilic hydrocarbon sulfonate, a surface active wood resin extracted from aged wood, a water soluble alkaline earth metal salt and an alkaline earth metal base; said mineral and said ingredients being present in said admixture in concentrations such that upon adding a predetermined weight of the admixture to water and oil, each barrel of the resulting emulsion contains from 4 to 30 lbs. of said pitch, from 1 to 10 lbs. of said sulfonate, from 1 to 20 lbs. of said wood resin, from 2 to 15 lbs. of said salt and from 2 to 20 lbs. of said base, said mineral having characteristics such that with the amount employed, the admixture is rendered dry and free-flowing and, upon addition of said admixture to said water and oil, a water-in-oil emulsion is formed.

13. A dry, free-flowing concentrate for adding to oil and water to prepare a water-in-oil emulsion well fluid, consisting essentially of an intimate admixture of, for each barrel of said well fluid to be prepared, 4 to 30 lbs. of vegetable pitch consisting of a crude material obtained in the processing of vegetable oil, said material having a higher molecular weight than said vegetable oil and containing polymers of fatty acids which acids are derived from said vegetable oil, from 1 to 10 lbs. per barrel of oleophilic hydrocarbon sulfonate, from 2 to 15 lbs. per barrel of a water soluble alkaline earth metal salt and from 2 to 20 lbs. per barrel of an alkaline earth metal base.

14. The concentrate of claim 13 in combination therewith of from 1 to 20 lbs. per barrel of a surface active wood resin selected from the group consisting of a resin extracted from aged wood and substantially insoluble in gasoline but soluble in furfural and alkali metal soaps of resins extracted from aged wood.

15. A dry, free-flowing concentrate for mixing with oil and water to form a water-in-oil emulsion well fluid, consisting essentially of an intimate admixture of ingredients for each barrel of emulsion to be prepared of about 5 to 20 lbs. of vegetable pitch consisting of a crude material obtained in the processing of vegetable oil, said material having a higher molecular weight than said vegetable oil and containing polymers of fatty acids which acids are derived from said vegetable oil, about 1 to 10 lbs. per barrel oleophilic hydrocarbon sulfonate, about 2 to 10 lbs. per barrel of a suface active wood resin extracted from aged wood and substantially insoluble in gasoline but soluble in furfural, about 5 to 10 lbs. per barrel of a water soluble alkaline earth metal salt and about 3 to 10 lbs. per barrel of an alkaline earth metl base.

16. The method of compounding a dry, free-flowing concentrate capable of imparting improved properties to a water-in-oil emulsion well fluid wherein the concentrate consists essentially of a clay, a water soluble alkaline earth metal compound, a vegetable pitch consisting of a crude material obtained in the processing of vegetable oil, said material having a higher molecular weight than said vegetable oil and containing polymers of fatty acids which acids are derived from said vegetable oil, and an oleophilic hydrocarbon sulfonate, which comprises, the steps of first intermixing said clay and said alkaline earth metal compound, separately mixing together said pitch and sulfonate, and then adding the resulting pitch-sulfonate mixture to the clay-alkaline earth metal compound intermixture.

17. The method of claim 16 wherein said pitch-sulfonate mixture is heated to a temperature in the range of 200 to 250° F. prior to adding the same to the clay-alkaline earth metal compound intermixture.

References Cited in the file of this patent

UNITED STATES PATENTS

| | | |
|---|---|---|
| 2,350,154 | Dawson | May 30, 1944 |
| 2,497,398 | Dawson | Feb. 14, 1950 |
| 2,557,647 | Gates et al. | June 19, 1951 |
| 2,582,323 | Fischer | Jan. 15, 1952 |
| 2,659,695 | Faust | Nov. 17, 1953 |
| 2,702,787 | Freeland | Feb. 22, 1955 |
| 2,713,032 | Tailleur | July 12, 1955 |
| 2,793,188 | Swain et al. | May 21, 1957 |
| 2,798,851 | Nelson et al. | July 9, 1957 |